United States Patent
Fukasawa

(10) Patent No.: US 8,749,815 B2
(45) Date of Patent: Jun. 10, 2014

(54) JOB PROCESSING METHOD, IMAGE PROCESSING SYSTEM AND IMAGE PROCESSING APPARATUS

(75) Inventor: Nobuaki Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 731 days.

(21) Appl. No.: 12/469,040

(22) Filed: May 20, 2009

(65) Prior Publication Data

US 2009/0296143 A1 Dec. 3, 2009

(30) Foreign Application Priority Data

Jun. 3, 2008 (JP) .................................. 2008-146219

(51) Int. Cl.
*G06F 3/12* (2006.01)
(52) U.S. Cl.
USPC .......................................... 358/1.15; 358/1.1
(58) Field of Classification Search
USPC ................................ 358/1.1, 1.15, 1.14, 1.13
See application file for complete search history.

(56) References Cited

U.S. PATENT DOCUMENTS 5,699,494 A * 12/1997 Colbert et al. ............... 358/1.15
7,079,266 B1 * 7/2006 Rai et al. ...................... 358/1.13
7,515,290 B2 * 4/2009 Negishi et al. ................ 358/1.15
2006/0031695 A1 * 2/2006 Isozaki et al. ................. 713/375
2007/0291286 A1 * 12/2007 Utsunomiya et al. .......... 358/1.8

FOREIGN PATENT DOCUMENTS

| CN | 1734438 A | 2/2006 | |
|---|---|---|---|
| JP | 2000-231470 | 8/2000 | |
| JP | 2004-288052 A | 10/2004 | |
| JP | 2004288052 | * 10/2004 | .............. G06F 17/60 |

OTHER PUBLICATIONS

ENglish translation for JP 2004288052.*
Office Action issued on Sep. 18, 2012, in counterpart Japanese Patent Application No. 2008-146219.

* cited by examiner

*Primary Examiner* — King Poon
*Assistant Examiner* — Iriana Cruz
(74) *Attorney, Agent, or Firm* — Fitzpatrick, Cella, Harper & Scinto

(57) ABSTRACT

In an image processing method in which a plurality of image processing apparatuses perform image processing in cooperation with each other, an image processing apparatus that issues a job sends an announcement notice informing that the job will be sent to image processing apparatuses designated to perform image processing in cooperation. When an image processing apparatus that has received the announcement notice receives a request to display job status from a user, it requests other image processing apparatuses that work in cooperation for job status information based on the announcement notice. Upon receiving responses to the request, the image processing apparatus notifies a user of the job status information.

6 Claims, 11 Drawing Sheets

FIG. 12

| ITEMS | | CONTENT |
|---|---|---|
| JOB ISSUER | | Ginji |
| JOB'S ISSUE DATE AND TIME | | 2007/06/07 16:19:08 (JST) |
| JOB NAME | | 200706071619008 |
| JOB ID | | A-1234 |
| DEVICE FLOW INFORMATION | 1 | MFP110 |
| | 2 | MFP120 |
| | 3 | MFP130 |
| | 4 | MFP140 |

FIG. 13

| ITEMS | | CONTENT |
|---|---|---|
| JOB ISSUER | | Ginji |
| JOB'S ISSUE DATE AND TIME | | 2007/06/08 12:10:08 (JST) |
| JOB NAME | | 20000608121008 |
| JOB ID | | A-5678 |
| DEVICE FLOW INFORMATION | 1 | MFP110 |
| | 2 | MFP120 |
| | 3-1 | MFP130 |
| | 3-2 | MFP140 |
| | 3-3 | MFP150 |
| | 3-4 | MFP160 |

JOB PROCESSING METHOD, IMAGE PROCESSING SYSTEM AND IMAGE PROCESSING APPARATUS

BACKGROUND OF THE INVENTION

1. Field of the Invention

The present invention generally relates to a job processing method, an image processing system and an image processing apparatus, particularly relates to a technique with which a plurality of image processing apparatuses execute a job in cooperation with each other.

2. Description of the Related Art

An image processing system is conventionally known in which a plurality of image processing apparatuses connected with a network perform a process in cooperation with each other.

In such a cooperation processing system, if a problem or the like occurs in an image processing apparatus that is a cooperative partner, it is necessary to accurately figure out the problem and solve it.

Japanese Patent Laid-Open No. 2000-231470 discloses this type of technique in which a server that manages the state of each apparatus is provided, and when a problem occurs in an apparatus that is a cooperative partner, the server searches again for another apparatus as a cooperative partner and changes the cooperative partner.

SUMMARY OF THE INVENTION

According to the above conventional technique, however, only the server manages the state of each apparatus, so it is not possible to check or change job status from an image processing apparatus to which the job is transferred.

For example, from an image processing apparatus that has been designated as a transfer destination candidate, but has not yet received a job, it is not possible to display job information, to perform operations on the job, etc.

The present invention has been conceived to solve such problems encountered with conventional techniques, and the present invention provides to make it possible to obtain the status of a job from an image processing apparatus that is a cooperative partner of the job.

The present invention includes the following configuration.

According to one aspect of the present invention, there is provided a job processing method in which a plurality of image processing apparatuses execute a job in cooperation with each other, the method comprising: sending an announcement notice informing that the job will be sent to an image processing apparatus designated to process the job in cooperation by an image processing apparatus that issues a job; notifying another image processing apparatus working in cooperation of information indicating the status of the job based on the announcement notice by the image processing apparatus that has received the announcement notice; and notifying a user of the received information indicating the status of the job by the image processing apparatus that has received the information indicating the status of the job.

According to the present invention, the status of a job can be obtained from an image processing apparatus that is a cooperative partner of the job.

Further features of the present invention will become apparent from the following description of exemplary embodiments with reference to the attached drawings.

BRIEF DESCRIPTION OF THE DRAWINGS

FIG. 12 is a diagram illustrating an example of an announcement notice.

FIG. 13 is a diagram illustrating an example of an announcement notice.

DESCRIPTION OF THE EMBODIMENTS

Figure 1:
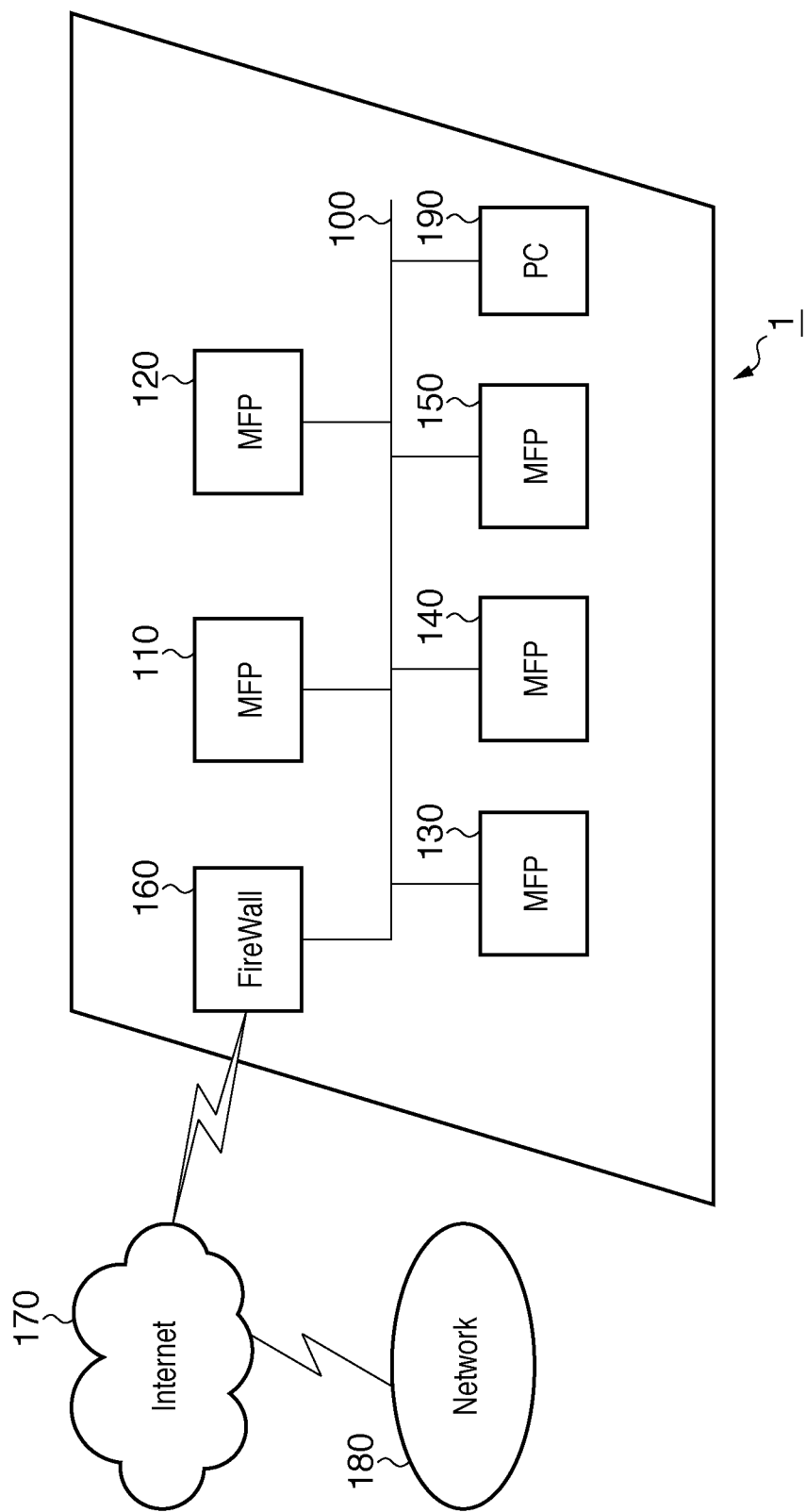
FIG. 1 is a diagram illustrating a configuration of an image processing system according to Embodiment 1 of the present invention.

Hereinafter, preferred embodiments of the present invention will be described in detail with reference to the accompanying drawings. It should be understood, however, that the constituent elements described in the following embodiments are merely exemplary, and therefore the scope of the present invention is not limited thereto.

Overview

In an image processing system according to an embodiment of the present invention, a plurality of image processing apparatuses perform the image processing of a single job in cooperation with each other using a network or another communication means.

Specifically, the image processing system of the present embodiment performs the following process as a process for obtaining job status information (information indicating the status of a job).

(1) An image processing apparatus that has created a job sends an announcement notice informing that the job will be input to an image processing apparatus that has been designated as a cooperative partner (provision of announcement notice).

(2) If an image processing apparatus as a cooperative partner has not been designated at the point in time when the job is created, an announcement notice is sent to a candidate image processing apparatus indicating that it has been selected as a candidate.

(3) The information (flow information) of another image processing apparatus as a cooperative partner is included in the announcement notice.

(4) When obtaining status information from any of the image processing apparatuses, a status inquiry is sent to each image processing apparatus based on the flow information. Inquiries are sent only when obtaining necessary information, so continuous polling for events is not performed.

In addition, the image processing system of the present embodiment performs the following processes in response to a job operation instruction such as changing the content of a job, canceling a job, suspending a job.

(1) Status information is acquired from each image processing apparatus to determine which image processing apparatus is currently processing the job.

(2) The job operation instruction is sent to the image processing apparatuses involved (i.e., the image processing apparatus that has issued the job, and the other image processing apparatus that has received the announcement notice). An image processing apparatus that has already finished processing does not execute the job operation.

(3) The image processing apparatus currently processing a job executes the job operation. An image processing apparatus waiting for a job executes the job operation after it has received the job.

Through the above processes, even when the image processing apparatuses are processing a job in cooperation with each other, it becomes possible to obtain and display such job status information from any of the image processing apparatuses based on the common information included in the announcement notice. In addition, because status information is obtained only when necessary, the load on the image processing apparatuses as well as on the communication means, such as a network, can be reduced. It also becomes possible to perform operations (to suspend, cancel, etc.) on the job when the image processing apparatuses are processing a job in cooperation with each other. Such a job operation is possible from any of the image processing apparatuses that work in cooperation.

That is, the present embodiment is intended to respond to a request to display job status on any of the image processing apparatuses while a cooperative job is being processed. Accordingly, the present embodiment realizes a system capable of tracking, acquiring and displaying the status information of a job that has not yet arrived at an image processing apparatus, the status information of a job sent to other image processing apparatuses, and job status information at the point in time when an image processing apparatus as a cooperative partner has not yet been designated. Specifically, an image processing apparatus that has created a job sends, to image processing apparatuses that are to work in cooperation, an announcement notice informing that the job will be input. When displaying job status on any of the image processing apparatuses, a job status information request is sent to the image processing apparatuses that are to work in cooperation based on the announcement notice, and the result of the responses is displayed.

Specific Configuration

FIG. 1 is a schematic diagram illustrating the configuration of an image processing system 1 according to an embodiment of the present invention. In the image processing system 1, MFPs (multifunction peripherals) 110 to 150 as image processing apparatuses are connected to a LAN 100, and a process required by a user is executed by the MFPs on the network in a distributed manner.

In FIG. 1, the image processing system 1 includes MFPs 110 to 150 and a PC 190, and they are connected to the LAN 100. A firewall 160 manages communication between the LAN 100 and the Internet 170. The LAN 100 is further connected to another network 180 via the firewall 160 and the Internet 170.

The PC 190 can create print jobs based on instructions from the user, and transfer the print jobs to the MFPs 110, 120 and 130. The MFPs that have received the transferred print job can process the print job. For example, image data read from an original image by a scanner unit of the MFP 110 can be processed by the MFP 120 (for example, by adding prescribed data of the MFP 120), and printed by a printer unit of the MFP 130. When cooperative processing is necessary, one MFP or more is selected, a print job (hereinafter, a print job processed through the cooperation of a plurality of apparatuses is referred to as a "cooperative job") is created, and the cooperative job is transferred to an MFP that first processes the job. The MFP that has received the cooperative job processes the job, and transfers the cooperative job to the next instructed MFP. After that, in the case of cooperative jobs, this process is repeated until an MFP that produces a final output.

A configuration is also possible in which the user selects, from any of the MFPs connected with a network, at least one MFP from among the other MFPs, then, a cooperative job is created, and transferred to an MFP that first processes the job. The MFP that has received the cooperative job processes the job, and transfers the cooperative job to the next instructed MFP. After that, in the case of cooperative jobs, this process is repeated until an MFP that produces a final output.

According to the present embodiment, it is possible to check job status or perform operations on a job from any of the apparatuses including the PC 109 that issues jobs and the MFPs 110 to 150 that processes cooperative jobs.

For example, a situation can occur in which the user has to wait for the MFP 130 to produce output when the MFP 120 is processing a cooperative job that is to be generated by the MFP 120, processed by the MFP 110 and finally output by the MFP 130. With the present embodiment, it becomes possible to acquire and display the status of such a cooperative job even from the MFP 130 that has not received the job, and perform operations on the job.

An internal configuration of the PC 190 of the image processing system will be described with reference to FIG. 2.

Figure 2:
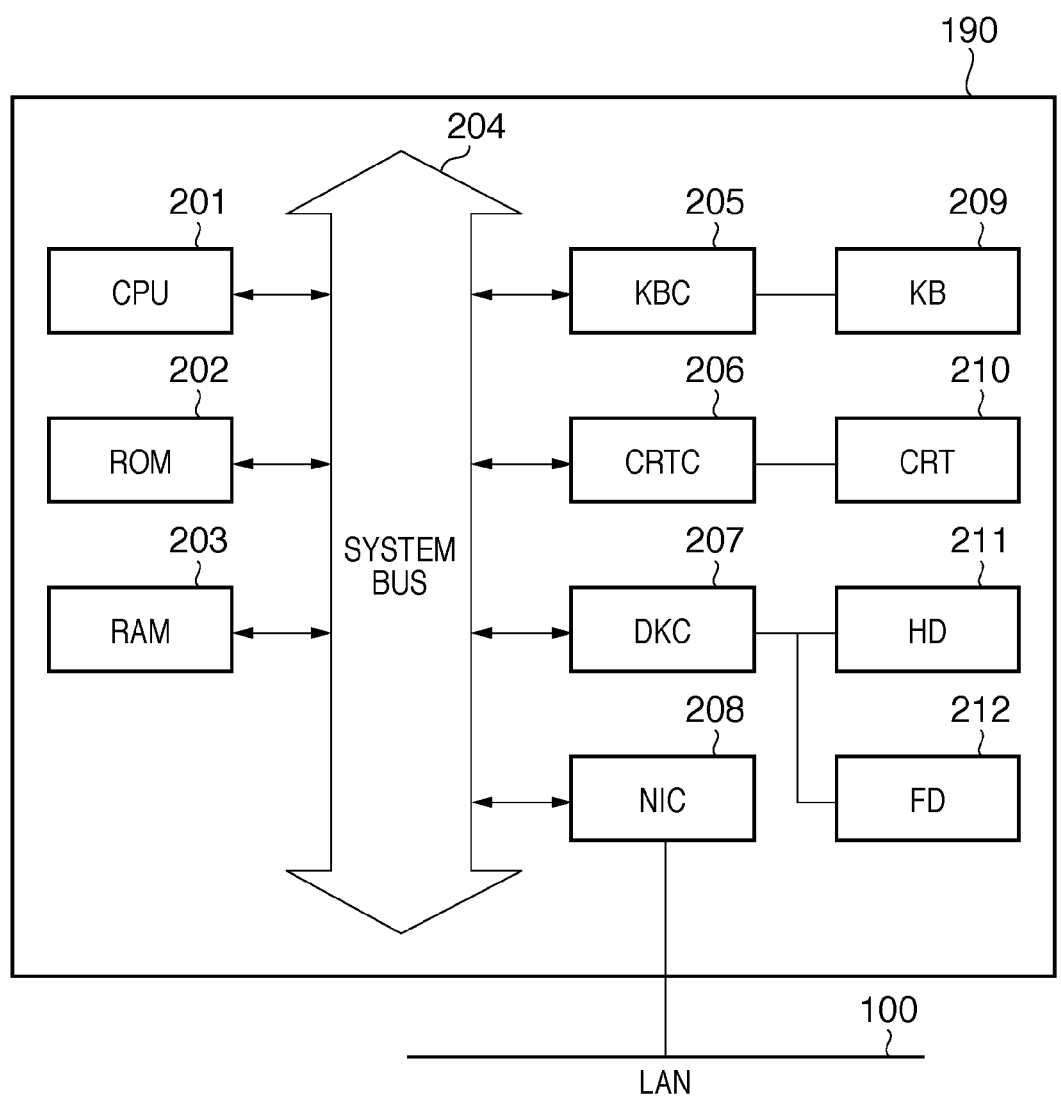
FIG. 2 is a diagram illustrating an internal configuration of a PC that can be used in the image processing system according to Embodiment 1 of the present invention.

The PC 190 includes, as shown in FIG. 2, a CPU 201, a ROM 202, a RAM 203, and a system bus 204. The PC 190 also includes a keyboard controller (KBC) 205, a CRT controller (CRTC) 206, a disk controller (DKC) 207, and a network interface card (NIC) 208. The PC 190 further includes a keyboard (KB) 209, a CRT 210, a hard disk (HD) 211, and a flexible disk (FD) 212.

The CPU 201 executes various programs stored in the ROM 202 or the HD 211, or various programs supplied from the FD 212. The CPU 201 collectively controls the constituent elements connected to the system bus 204. The RAM 203 functions as a primary memory or working area for the CPU 201.

The KBC 205 controls the input of instructions from the KB 209, a pointing MFP (not shown) and so on. The CRTC 206 controls the display of the CRT 210.

The HD 211 and the FD 212 are prepared as storage areas that implement a function for storing a boot program, a program for operating (controlling) MFPs, and various applications, and a box function for storing image data and a user file. The DKC 207 controls access to the HD 211 and the FD 212. The NIC 208 enables the transmission and reception (two-way communication) of data (image data, etc.) to and from devices (including other network devices) connected to the LAN 100 via the LAN 100.

Figure 3:
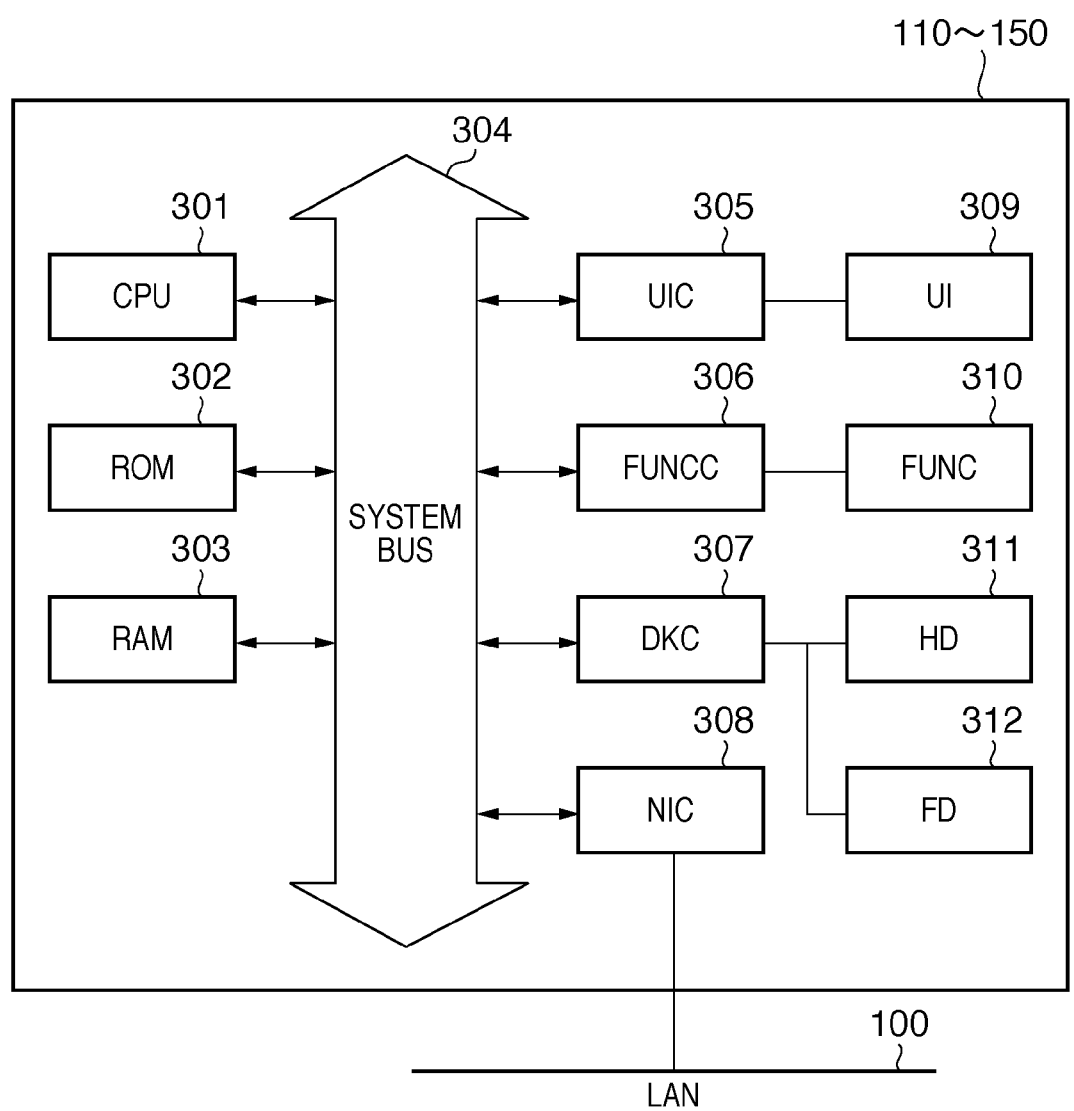
FIG. 3 is a diagram illustrating an internal configuration of an image processing apparatus that can be used in the image processing system according to Embodiment 1 of the present invention.

An internal configuration of the MFPs 110 to 150 will be described with reference to FIG. 3. The MFPs 110 to 150 are equipped with a CPU 301 that executes various programs that are stored in a ROM 302 or a hard disk (HD) 311 or supplied from a Floppy® disk drive (FD) 312. The CPU 301 also collectively controls the devices connected to a system bus 304. A RAM 303 functions as a primary memory or working area for the CPU 301. A user interface controller (UIC) 305 controls the display of a user interface (UI) 309 and the input of instructions from the UI 309. A function controller (FUNCC) 306 implements and controls a function (FUNC) 310 unique to each MFP. The FUNC 310 of each MFP can have a different configuration. Examples of the configuration include a scanner unit that reads an original image and displays the image, a printer unit that prints an image based on inputted image data onto recording paper, etc. The MFPs with a monochrome printer have a monochrome print engine controller and a monochrome print engine. The MFPs with a color printer have a color print engine controller and a color print engine. Examples of the scanner unit include a color scanner that reads color images, and a monochrome scanner that reads monochrome documents. However, the configuration is not limited thereto, and it is possible to combine various functions such as a facsimile function and an image edit function as appropriate. The MFPs 110 to 150 each have a function controller (FUNCC) 306 and a function (FUNC) 310 for providing a function described above. The DKC 307 has a function for storing a boot program, a program for operating (controlling) the MFPs, a program for working in cooperation with other apparatuses, and various applications. The DKC 307 also controls the HD 311 and the FD 312 as storage areas that implement a box function for storing image data. A network interface card (NIC) 308 bidirectionally exchanges data with other MFPs, a network printer or another PC connected to the LAN 100.

State Examples

Figure 4:
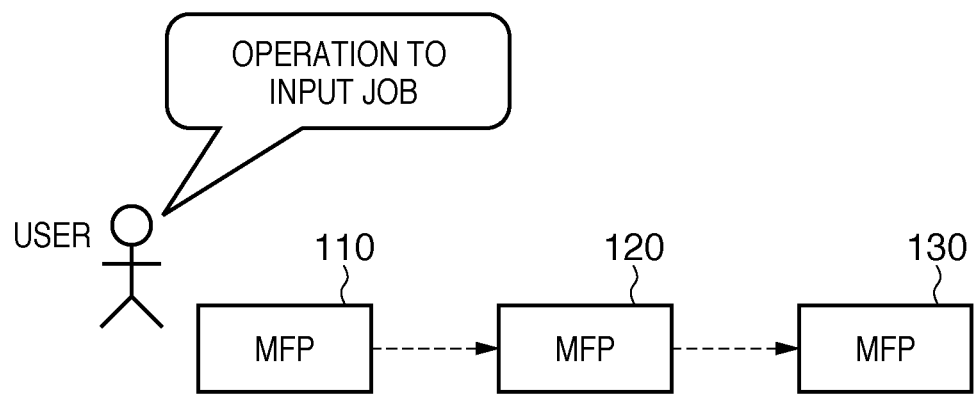
FIG. 4 is a diagram illustrating an example of a process for executing a cooperative job.

FIG. 4 shows an example of a job flow when three MFPs 110 to 130 of the image processing system 1 are used cooperatively. First, the user operates the MFP 110 to cause the MFP 110 to create a cooperative job and start the process. The MFPs 120 and 130 have been selected as cooperative MFPs, and the process is performed in this order. For example, image data read from an original image by a scanner unit of the MFP 110 is processed by the MFP 120 (for example, prescribed data stored in the MFP 120 is added by the MFP 120), and printed by a printer unit of the MFP 130.

Figure 5:
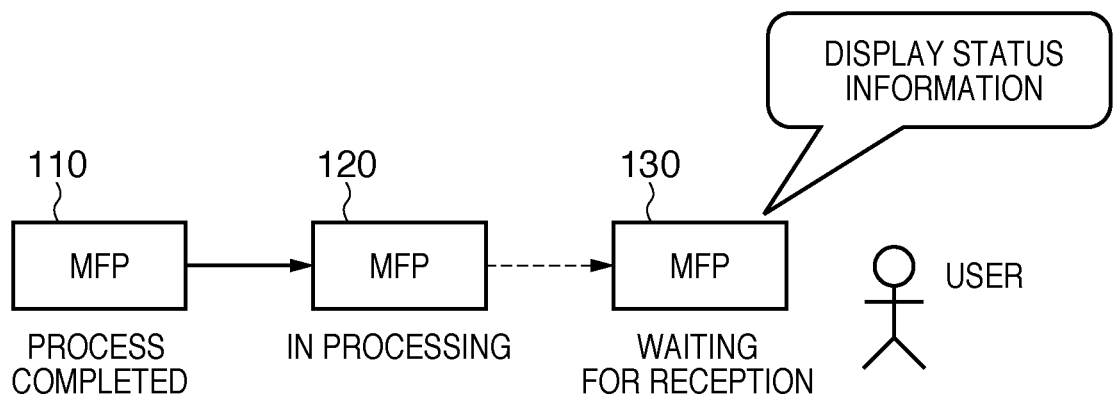
FIG. 5 is a diagram illustrating an example of a process for executing a cooperative job.

FIG. 5 shows a state in which the user is waiting for the MFP 130 that produces a final output to finish processing after the state shown in FIG. 4. In FIG. 5, a cooperative job is to be processed in this order: MFP 110, MFP 120, and MFP 130. Here, the MFP 110 has finished processing the job, the MFP 120 is currently processing the job, and the MFP 130 is waiting for reception of the cooperative job. The user can operate the MFP 130 while he/she is waiting for the MFP 130 to complete processing the job, and thereby the current status (status information) of the job in the image processing system can be displayed.

Figure 6:
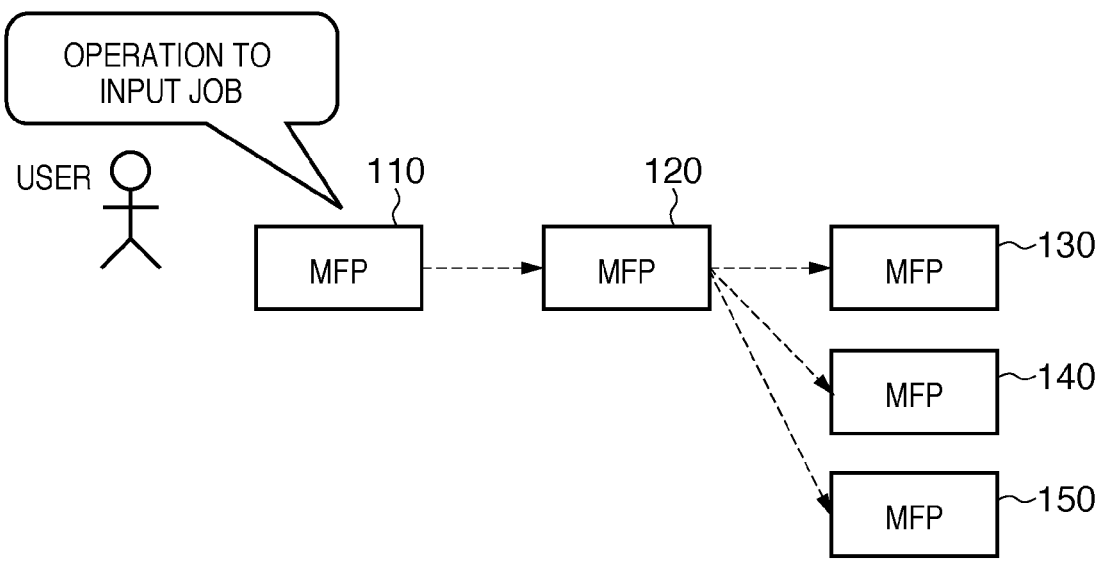
FIG. 6 is a diagram illustrating an example of a process for executing a cooperative job.

FIG. 6 shows a state in which in the image processing system 1, not all cooperative MFPs have been designated (determined) when a cooperative job is input. The user operates the MFP 110 to cause the MFP 110 to create a cooperative job and start the process. At this time, the MFP 120 has been designated as the second cooperative MFP, but the third cooperative MFP is not determined yet, and simply the MFPs 130, 140 and 150 are listed as candidates. That is, to which one of the MFPs the job is to be transferred next has not been determined. If the third cooperative MFP is determined when the MFP 120 finishes processing the job, the job will be transferred to the determined cooperative MFP. The third cooperative MFP can be, for example, one of the MFPs 130, 140 and 150 that can finish processing first when the MFP 120 becomes ready to transfer the job (image data) after it finishes processing.

Figure 7:
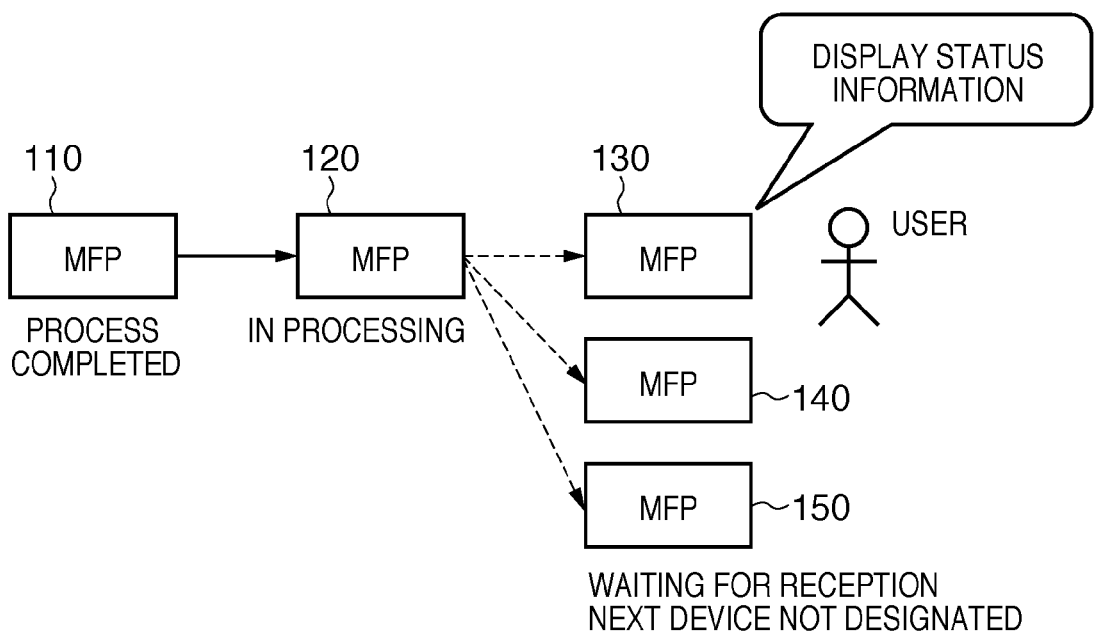
FIG. 7 is a diagram illustrating an example of a process for executing a cooperative job.

FIG. 7 shows a state in which the user is waiting for one of the candidates for the cooperative MFP that produces final output to finish processing after the state of FIG. 6. In FIG. 7, it has been determined that a cooperative job is processed by the MFP 110 first and then by the MFP 120, the MFP 110 has already finished processing, and the MFP 120 is currently processing the cooperative job. However, the third cooperative MFP has not yet been determined from among the candidates: MFPs 130, 140 and 150. In the system of the present embodiment, the user who is waiting for the MFP 130, which is an MFP selected from among the candidate MFPs, to finish processing the job can operate the MFP 130 to display the current status of the job.

Specific Process Flow

Figure 8:
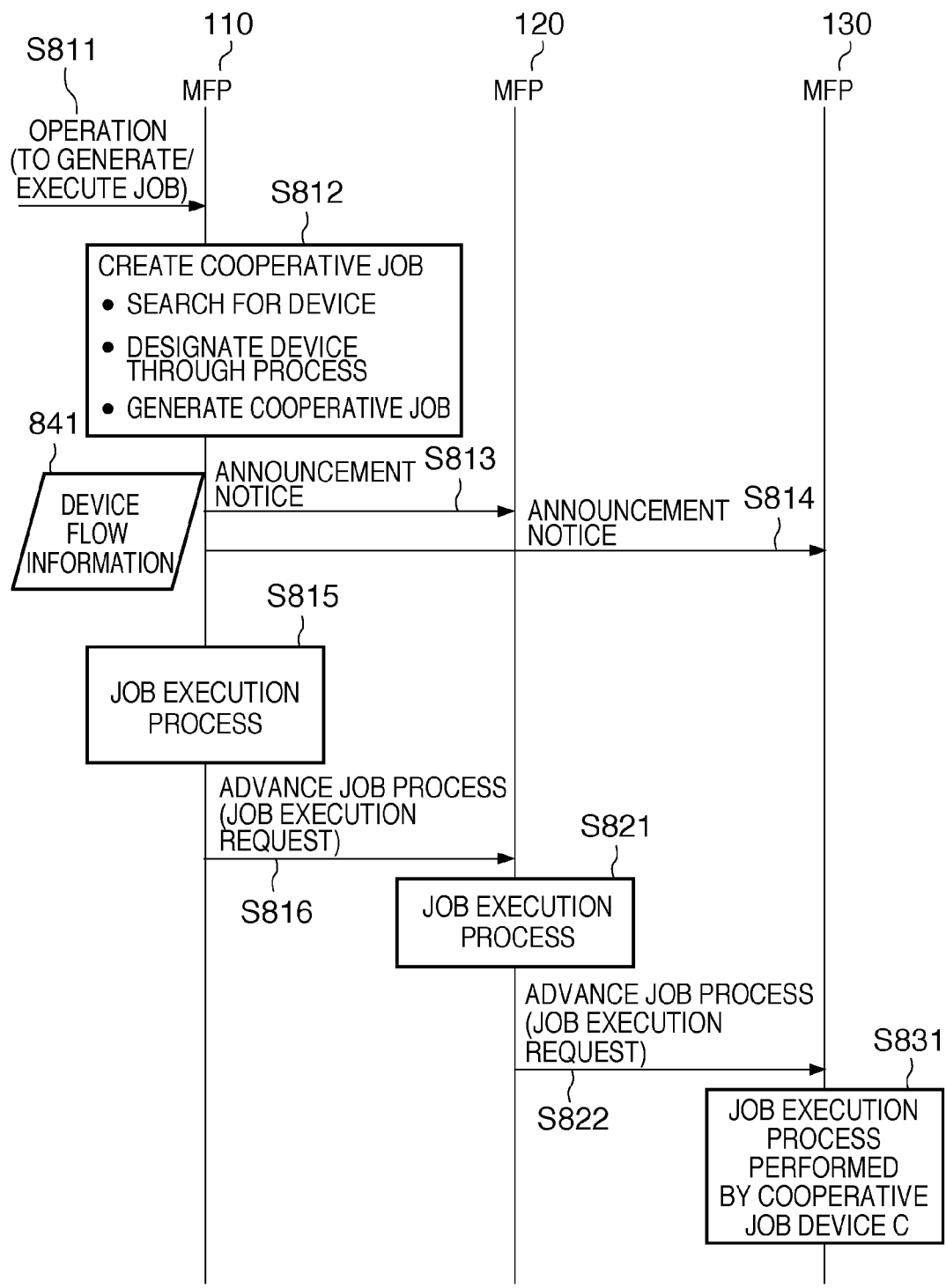
FIG. 8 is a sequence diagram illustrating operations of devices in the image processing system according to Embodiment 1 of the present invention.

FIG. 8 shows a communication sequence among the MFPs in the state of FIG. 4. The user operates the MFP 110 to input a cooperative job (S811). At this time, the MFP 110 searches for MFPs that can execute the cooperative job from among the MFPs with which it can communicate, determines MFPs that will process the cooperative job in cooperation, and generates a cooperative job (S812).

Next, the MFP 110 creates device flow information 841, and sends, to the MFPs 120 and 130, an announcement notice informing that the cooperative job will be sent, together with the device flow information 841 (S813, S814). This announcement notice includes information indicating that the cooperative job will be transferred, information for identifying each cooperative MFP (apparatus name, etc.), a job ID for identifying the cooperative job, etc. Through this, each MFP manages the job data, the job status and so on with the common job ID.

Next, the MFP 110 executes its assigned task of the job (S815). After S815, the MFP 110 sends a job execution request to the MFP 120 in order to advance the process of the cooperative job (S816). This job execution request includes the job ID, etc. Upon receiving the job execution request, the MFP 120 executes its assigned task of the cooperative job corresponding to the announcement notice received previously. After it finishes processing, in the same manner as the above, the MFP 120 sends a job execution request to the MFP 130 in order to advance the process of the cooperative job (S822). Upon receiving the job execution request, the MFP 130 executes its assigned task of the job (S831).

Figure 9:
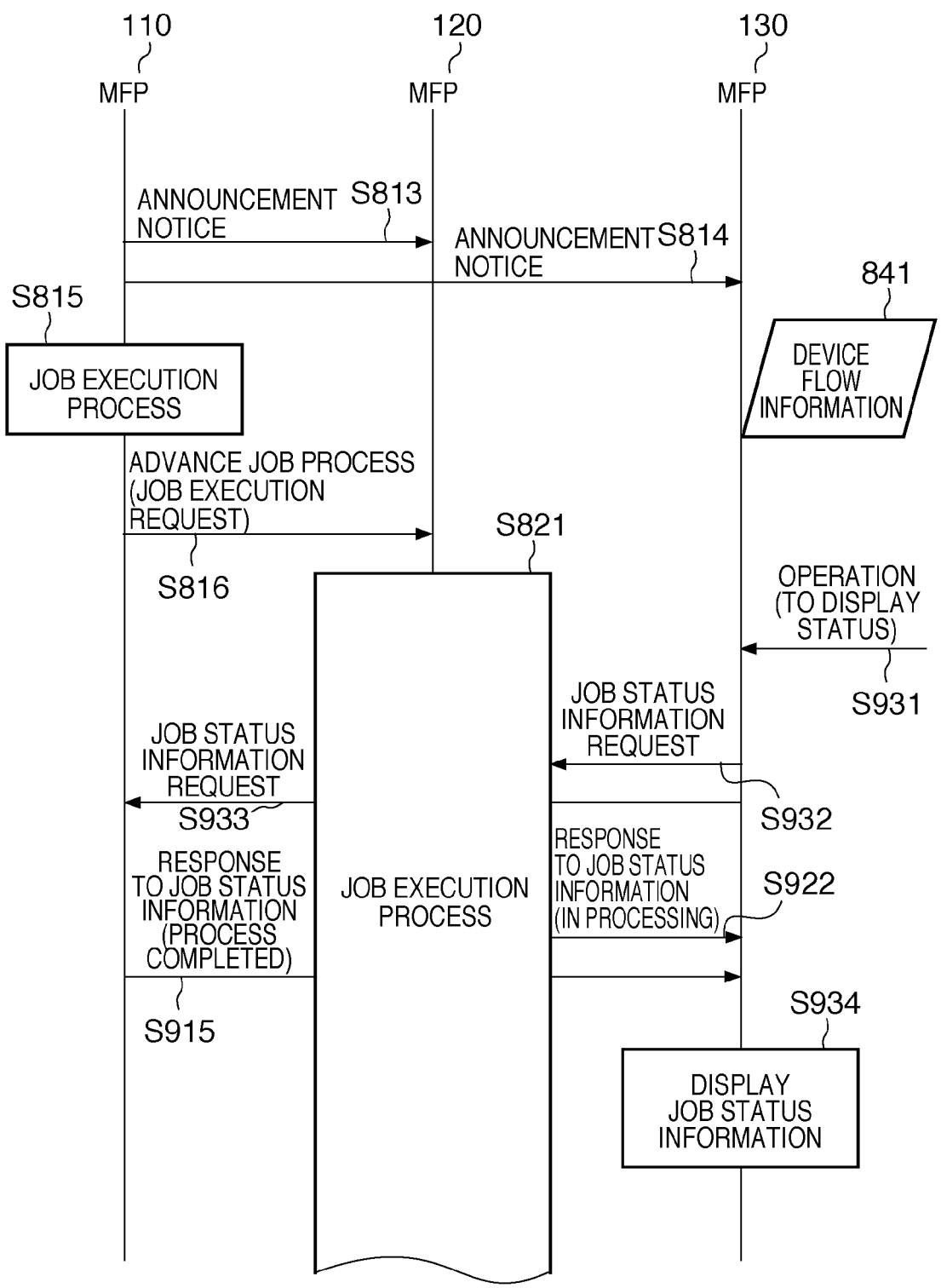
FIG. 9 is a sequence diagram illustrating operations of devices in the image processing system according to Embodiment 1 of the present invention.

FIG. 9 shows a communication sequence among the MFPs in the state of FIG. 5. The processes up to S821 are the same as those of FIG. 8, and, as such, the same reference numerals are assigned to the same processes, and descriptions thereof are omitted here.

In S931, when the MFP 130 receives an operation to request status information from the user, the MFP 130 sends a status information request including the job ID included in the previous announcement notice to the MFPs 110 and 120 (S932, S933). Specifically, the MFP 130 operates the UI 309 to display a job list, and when a job is selected from that list, the corresponding flow information and job ID are read, and a status information request is sent. At this time, the MFP 130 designates the MFPs 110 and 120 as a destination of the status information request in accordance with the flow information 841 obtained from the announcement notice. In response to the status information request, the MFP 110 returns a message (completion of process) indicating that it has finished processing the job having that job ID to the MFP 130 as a status information response (S915). Likewise, in response to the status information request, the MFP 120 returns a message (in processing) indicating that it is currently processing the job having that job ID to the MFP 130 as a status information response (S915). Upon receiving the responses to the job status information request, the MFP 130 displays job status information on the UI 309 based on the responses (S934). If status information is requested from a PC accessing the MFP 130, the MFP 130 displays the job status information on a screen of the PC based on the received responses. As a method of notifying the user of the information, displaying the information on a screen was shown, but the method is not limited thereto, and it is possible to employ any other notification method such as by printing the information onto recording paper, by voice or sound, or the like.

Figure 10:
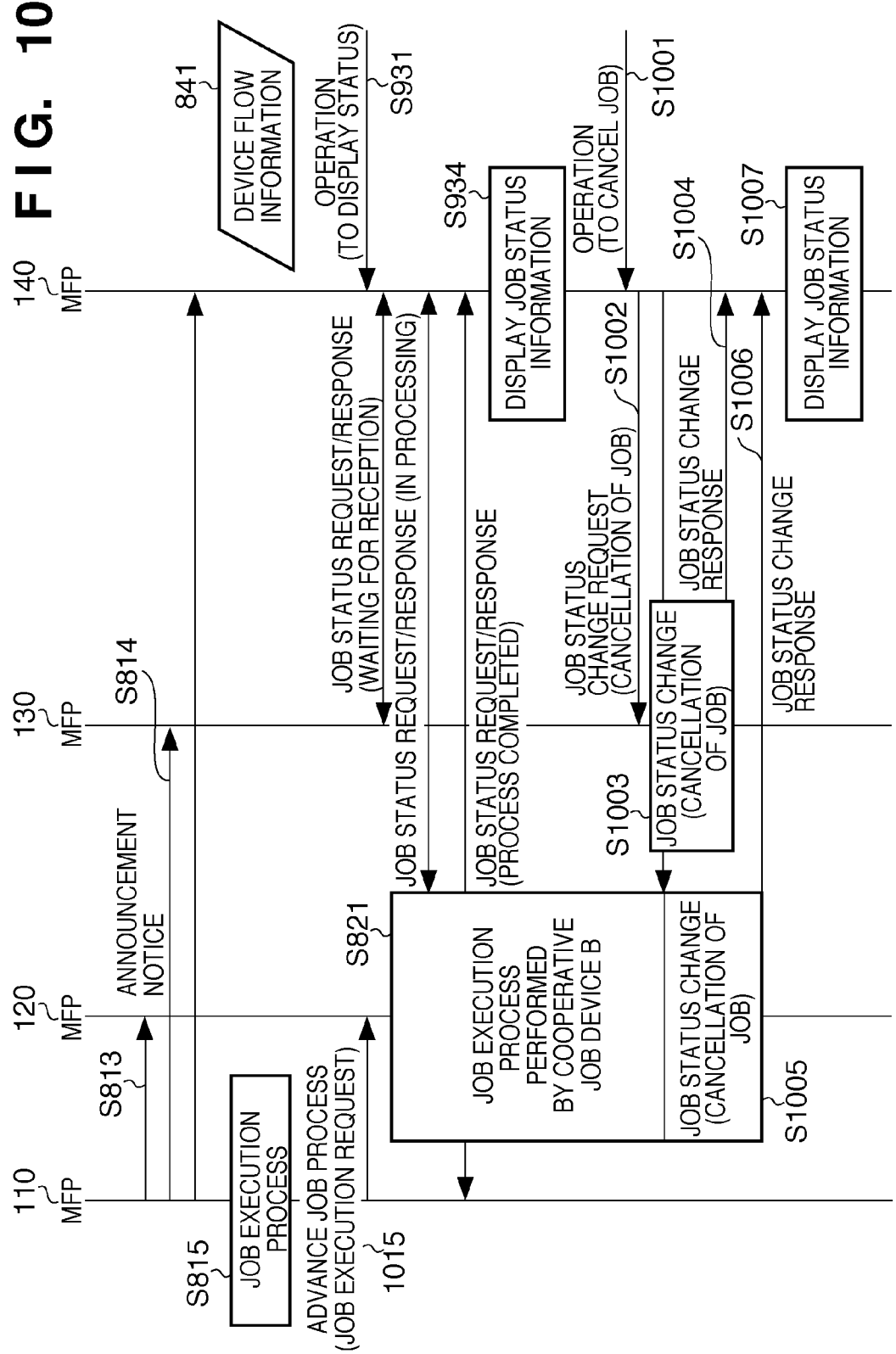
FIG. 10 is a sequence diagram illustrating operations of devices in the image processing system according to Embodiment 1 of the present invention.

FIG. 10 shows a communication sequence among the MFPs when a change is made in job status (an operation is performed on a job) while a cooperative job is being executed. This sequence is a continuation of the information display sequence shown in FIG. 9, and, as such, the same reference numerals are assigned to the same processes of FIG. 9, and descriptions thereof are omitted here.

In S1001, when the MFP 140, which is one of the cooperative partners, receives an operation to request cancellation of a job through the UI 309 or from the PC, the MFP 104 advances the process to S1002. In S1002, a job status change request (job cancellation) is sent to other devices that have not completed processing the job (the MFPs 120 and 130 in this case) determined from among the cooperative partners based on the information, such as the job ID, included in the announcement notice of that job.

Upon receiving the job status change request (job cancellation), the MFP 130 performs a job status change process (S1003) for the cooperative job, or in other words, cancels the job. After this, the MFP 130 returns a job status change response indicating that the job has been cancelled to the MFP 140 (S1004).

When the MFP 120 receives the status change request (job cancellation), it stops processing of the currently processing job, and performs a job status change process, that is, cancels the job (S1005). After this, the MFP 120 returns a job status change response to the MFP 140 (S1006).

Upon receiving the responses to the job status change request, the MFP 140 updates the display of the job status information on the UI 309 or the PC according to the responses (S1007).

Figure 11:
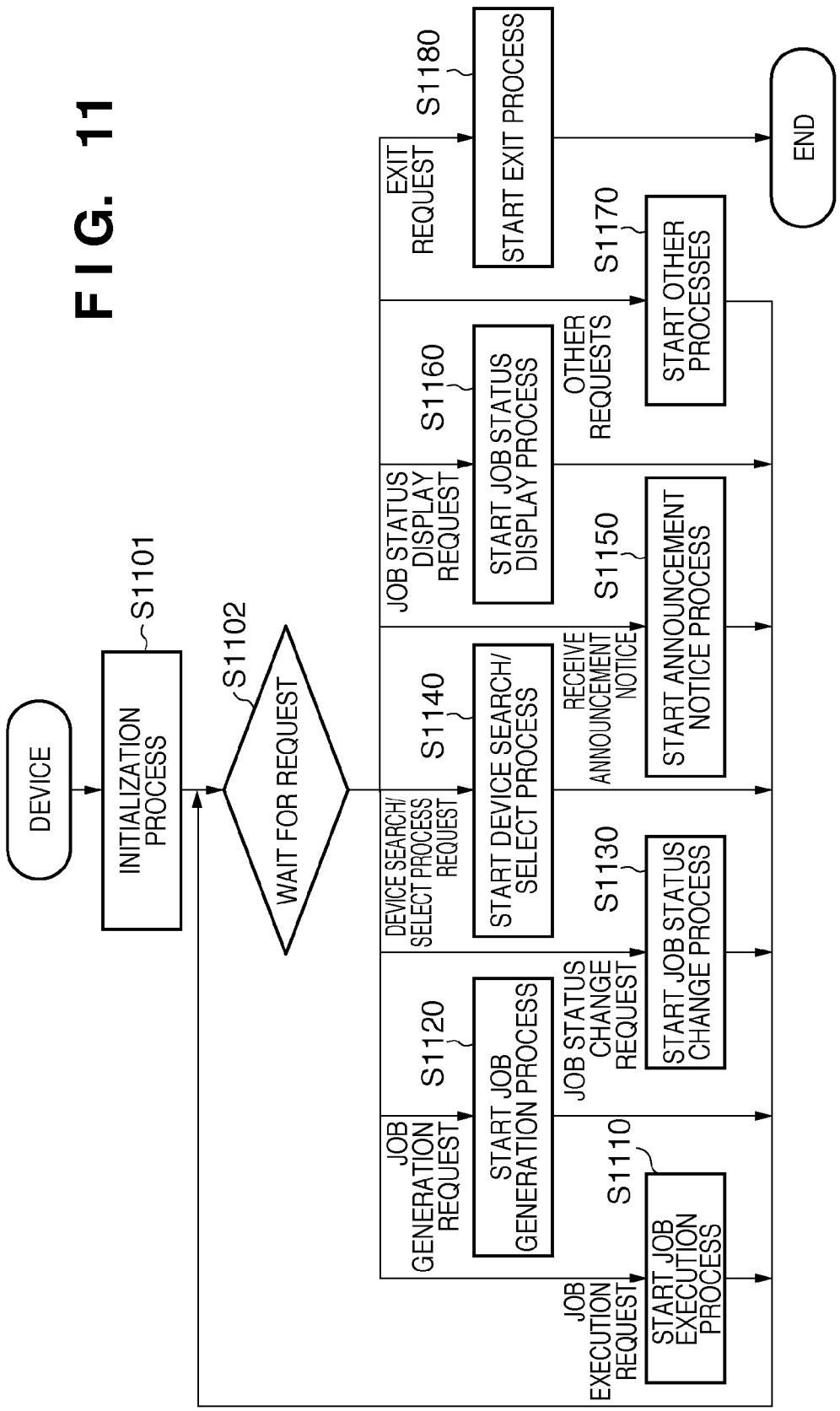
FIG. 11 is a flowchart illustrating a process flow performed by an image processing apparatus according to Embodiment 1 of the present invention.

FIG. 11 is a flowchart illustrating the process performed by each MFP. This flowchart shows a process flow executed by the CPU 301 reading a computer program stored in the ROM 302, the HD 311 or the like. When turned on, the MFP performs an initialization process S1101, and then waits for reception of a request from the UI 309 or an external device, in S1102. If it is determined that the MFP has received a request for job execution, the process advances to S1110 where the MFP starts a job execution process, and then the process returns to S1102 where the MFP waits again for reception of a request from the UI 309 or an external device. If the MFP receives a request for job generation, the process advances to S1120 where the MFP starts a job generation process, and then the process returns to S1102 where the MFP waits again for reception of a request from the UI 309 or an external device. If the MFP receives a request for job status change, the process advances to S1130 where the MFP starts a job status change request process, and then the process returns to S1102 where the MFP waits again for reception of a request from the UI 309 or an external device. If the MFP receives a request for an MFP search/select process, the process advances to S1140 where the MFP starts an MFP search/select process, and then the process returns to S1102 where the MFP waits again for reception of a request from the UI 309 or an external device. If the MFP receives an announcement notice, the process advances to S1150 where the MFP starts an announcement notice process, and then the process returns to S1102 where the MFP waits again for reception of a request from the UI 309 or an external device. If the MFP receives a request to display job status, the process advances to S1160 where the MFP starts a job status display process, and then the process returns to S1102 where the MFP waits again for reception of a request from the UI 309 or an external device. If the MFP receives other requests, the process advances to S1170 where the MFP starts a process according to the request, and then the process returns to S1102 where the MFP waits again for reception of a request from the UI 309 or an external device. If the MFP receives an exit request, the process advances to S1180 where the MFP starts an exit process, and then operation of the MFP ends (the MFP is turned off).

The following describes how each of the MFPs of FIGS. 8 to 10 performs processing in FIG. 11.

Upon receiving an instruction to generate/execute a job through the operation of the UI 309 or an external PC by the user, the MFP 110 of FIGS. 8 to 10 first executes S1140 where it searches for apparatuses that can execute the job, and determines the apparatuses that will execute the job in cooperation. In the next step, S1120, the MFP 110 generates a cooperative job including a task assigned to each apparatus to be executed. Then, in S1150, the MFP 110 sends an announcement notice as described above to the apparatuses designated as cooperative partners. In S1110, the MFP 110 executes its assigned task of the job, and then sends image data as a result of executing the job and a job execution request to other MFPs which are cooperative partners. The MFPs 120 and 130 of FIG. 8 receive the announcement notice in S1150, receive the job execution request in S1110, and execute the cooperative job.

In S1160, the MFP 110 of FIG. 9 receives a job status information request and returns a response to the request. When the MFP 120 of FIG. 9 receives a job status information request while it is executing the job in S1160, it returns a response to the request. The MFP 130 of FIG. 9 executes S1160 upon receiving a request to display status information through a user's operation (through the UI 309 or the PC). That is, in S1160, transmission of a job status information request, reception of a job status information response, and a process for displaying job status information are performed.

In S1130, the MFP 120 of FIG. 10 performs reception of a job status change request, a job status change process, and transmission of a job status change response. In S1130, the MFP 130 of FIG. 10 receives a job status change request and sends a response to the request. The reception of a job status change request, the job status change process, and the transmission of a job status change response shown in S1002 to S1004 of FIG. 10 are performed by a process that is started in S1130 of FIG. 11.

In FIG. 11, the process performed by the MFP 140 of FIG. 10 is as follows. The processes up to S1160 where a job status information display process is performed are the same as those performed by the MFP 130 of FIG. 9.

When a request to cancel a job is inputted through the operation of the UI 309 or the PC by the user, in S1130 of FIG. 11, a job status change process starts. The subsequent process of sending a job status change request and receiving a job status change response is performed in the job status change process started in S1130 of FIG. 11. Then, the process of displaying job status information of FIG. 10 is performed by the process started in S1160 of FIG. 11.

FIG. 12 is a diagram illustrating an example of information included in an announcement notice. A column 1210 shows the items of information included in the announcement notice, and a column 1220 shows the detailed information. A line 1230 indicates that the issuer who issued the job is "Ginji". A line 1231 indicates that the job was issued at 16:19:08 on Jun. 7, 2007 (Japan time). A line 1232 indicates that the name of the job is 20070607161908. A line 1233 indicates that the job ID is A-1234. The subsequent lines 1240 to 1244 show the content of the flow information 841 of FIG. 8. The line 1241 indicates that the MFP 110 is the first MFP that processes the cooperative job. Likewise, the lines 1242 to 1244 indicate that the MFP 120 is the second, the MFP 130 is the third, and the MFP 140 is the fourth, respectively. The flow information shown here is flow information obtained when cooperative MFPs are already determined at the point in time when a job is inputted to the first MFP, as shown in FIG. 4.

FIG. 13 is a diagram illustrating another example of an announcement notice. This is an announcement notice obtained when cooperative MFPs are not determined when a job is input, as shown in FIG. 6. In FIG. 13, columns 1210 and 1220, and lines 1230 to 1241 are the same as those of FIG. 12, so descriptions thereof are omitted here.

Lines 1343 to 1346 indicate that the third cooperative device has not been determined at the point in time when this announcement notice is created, and MFP 130, MFP 140, MFP 150 and MFP 160 are listed as candidates for the third cooperative device.

It is to be understood that the announcement notices, the items of flow information, and the content of the flow information described above are merely exemplary, and, thus, for example, IP address or the like can be used instead of apparatus name as information for identifying MFPs that is included in such flow information.

As described above, according to the present embodiment, in an image processing system in which a plurality of image processing apparatuses process a single job in cooperation with each other, it becomes possible to obtain/display job status information from any of the image processing apparatuses while they are processing the job in cooperation with each other. In addition, because status information is obtained only when necessary, the load on the image processing apparatuses, as well as on the communication means, such as a network, can be reduced. Furthermore, it becomes possible to perform operations (to suspend, cancel, etc.) on the job while the image processing apparatuses are processing the job in cooperation with each other.

Other Embodiments

An embodiment of the present invention has been described in detail above, but the present invention may be applied to a system configured of a plurality of devices or an apparatus configured of a single device. Although the above described embodiment was presented in the context of an example in which the image processing apparatuses are MFPs, it is possible to use various image processing apparatuses including single-function printers, scanners and so on. Also, the image processing apparatuses are not limited to apparatuses that receive and process image data, and it is also possible to use finishing apparatuses that staple or bind paper sheets printed by other apparatuses. If, for example, a scanner is used as the first cooperative partner, a printer as the second cooperative partner, and a finishing apparatus as the third cooperative partner, these apparatuses are connected with a network, and an announcement notice is sent from the scanner as the first apparatus to the printer and the finishing apparatus in the manner described above. Image data read from an original image by the scanner is sent to the printer via the network, and the printer prints out an image onto paper based on the received image data. Then, the user loads the printed paper into the finishing apparatus, and invokes the job ID corresponding to the announcement notice from an operation unit of the finishing apparatus to perform a finishing process. With this configuration, even when part of such processing is implemented without involving the network, it becomes possible to check job status and perform operations on the jobs.

It should be noted that the present invention can also be achieved by directly or remotely supplying a program that implements the functions of the above-described embodiment to a system or apparatus, and then having the system or apparatus read and execute the supplied program code. Accordingly, the computer code itself installed on a computer to implement the functional process of the present invention with a computer is also included in the scope of the present invention.

In this case the program can take any form such as object code, a program executed by an interpreter or script data supplied to an OS, etc. as long as the program has the functions of the program.

Recording media for supplying the program include, for example, a Floppy® disk, a hard disk, an optical disk, and a magneto-optical disk. Other possibilities include MO, CD-ROM, CD-R, CD-RW, magnetic tape, non-volatile memory card, ROM, DVD (DVD-ROM, DVD-R), and so on.

In addition, it is also possible to employ a method in which a connection is made to an Internet website using a browser of a client PC, and then the program of the invention or a file that further includes an automatic installation function is downloaded onto a recording medium such as a hard disk. It is also possible to implement the present invention by dividing up the program code constituting the program of the present invention into a plurality of files and then downloading each of the files from different websites. In other words, a WWW server that allows the program for implementing the functional process of the present invention on a computer to be downloaded by a plurality of users also falls within the scope of the invention. It is also possible to encrypt the program of the present invention, store it on a storage medium such as a CD-ROM, and distribute it to users. It is also possible to allow users that have satisfied predetermined conditions to download key information that decodes the encryption from a website through the Internet, and then, through the user using that key information, to execute the encrypted program and install it on a computer.

In addition, an OS or the like running on a computer performs part or all of the actual processing based on the instructions of the program, and the functions of the above-described embodiment may also be implemented through this processing.

Furthermore, the case where the program of the present invention is written into a memory provided in a function expansion unit of a PC and part or all of the actual processing is performed by a CPU or the like provided in the function expansion unit based on the program is also included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-146219, filed on Jun. 3, 2008, which is hereby incorporated by reference herein in its entirety.

What is claimed is:

1. A job processing method in which a plurality of image processing apparatuses execute a job in cooperation with each other, the job processing method comprising:
    an announcement notice step of sending, via a network, an announcement notice informing that the job will be sent, to a second image processing apparatus and a third image processing apparatus working in cooperation, by a first image processing apparatus that issues a job;
    a job status notice step of notifying, via the network, the third image processing apparatus working in cooperation of information indicating the status of the job based on the announcement notice, by the second image processing apparatus that has received the announcement notice; and
    displaying the notified information indicating the status of the job on a display screen of the third image processing apparatus working in cooperation,
    wherein, in the announcement notice step, if the third image processing apparatus working in cooperation has not been designated at the point in time when the job is issued, the announcement notice is sent to a plurality of image processing apparatuses as candidates for the third image processing apparatus working in cooperation, and
    wherein the information indicating the status of the job is notified of the candidates for the third image processing apparatus and displayed.

2. The job processing method according to claim 1, said job processing method further comprising:
    accepting a job operation instruction from a user, by a candidate for the third image processing apparatus working in cooperation; and
    sending the job operation instruction to the second image processing apparatus that has received the announcement notice and the first image processing apparatus that issues the job.

3. The job processing method according to claim 1, wherein the announcement notice includes information regarding all of the image processing apparatuses involved in the job processed in cooperation.

4. The job processing method according to claim 1, wherein the second image processing apparatus that has received the announcement notice notifies a candidate for the third image processing apparatus working in cooperation of the information indicating the status of the job in response to a request from the candidate for the third image processing apparatus working in cooperation.

5. An image processing system, comprising a plurality of image processing apparatuses that execute a job in cooperation with each other, wherein
    a first image processing apparatus that issues a job includes an announcement notice unit adapted to send, via a network, an announcement notice informing that the job will be sent, to a second image processing apparatus and a third image processing apparatus working in cooperation,
    the second image processing apparatus that has received the announcement notice includes a job status notice unit adapted to notify, via the network, the third image processing apparatus working in cooperation of information indicating the status of the job based on the announcement notice, and
    the notified information indicating the status of the job is displayed on a display screen of the third image processing apparatuses working in cooperation,
    wherein if the third image processing apparatus working in cooperation has not been designated at the point in time when the job is issued by the first image processing apparatus, the announcement notice is sent to a plurality of image processing apparatuses as candidates for the third image processing apparatus working in cooperation, and
    wherein the information indicating the status of the job is notified of the candidates for the third image processing apparatus and displayed.

6. An image processing apparatus that executes a job in cooperation with other image processing apparatuses, the image processing apparatus comprising:
    an announcement notice unit adapted to, when issuing a cooperative job to be executed in cooperation with a second image processing apparatus and a third image processing apparatus, send, via a network, an announcement notice informing that the job will be sent, to the second image processing apparatus and third image processing apparatus working in cooperation, when functioning as a first image processing apparatus; and
    a request unit adapted to request, via the network, the third image processing apparatus working in cooperation to which the announcement notice has been sent for information indicating the status of the job based on the announcement notice, when functioning as the second image processing apparatus,
    wherein the notified information indicating the status of the job is displayed on a display screen of the third image processing apparatus working in cooperation,
    wherein if the third image processing apparatus working in cooperation has not been designated at the point in time when the job is issued, the announcement notice is sent to a plurality of image processing apparatuses as candidates for the third image processing apparatus working in cooperation by the announcement notice unit, and
    wherein the information indicating the status of the job is notified of the candidates for the third image processing apparatus and displayed.

* * * * *